(12) United States Patent
Kawazoe et al.

(10) Patent No.: US 6,611,438 B2
(45) Date of Patent: Aug. 26, 2003

(54) POWER GENERATION APPARATUS USING PERMANENT-MAGNET GENERATOR

(75) Inventors: Hironari Kawazoe, Chiyoda-ku (JP); Motoo Futami, Chiyoda-ku (JP); Akira Kikuchi, Chiyoda-ku (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/192,316

(22) Filed: Jul. 11, 2002

(65) Prior Publication Data

US 2003/0007371 A1 Jan. 9, 2003

Related U.S. Application Data

(63) Continuation of application No. 10/100,161, filed on Mar. 19, 2002.

(30) Foreign Application Priority Data

Jun. 29, 2001 (JP) ......................................... 2001-197652

(51) Int. Cl.[7] ........................... H02M 5/45; H02M 5/458
(52) U.S. Cl. .............................. 363/37; 363/34; 363/72
(58) Field of Search ........................... 363/37, 34, 71, 363/72

(56) References Cited

U.S. PATENT DOCUMENTS

| 4,939,441 | A | * | 7/1990 | Dhyanchand | 290/46 |
|---|---|---|---|---|---|
| 4,947,100 | A | * | 8/1990 | Dhyanchand et al. | 290/38 R |
| 4,968,926 | A | * | 11/1990 | Dhyanchand | 290/38 R |
| 5,008,801 | A | * | 4/1991 | Glennon | 323/361 |
| 5,015,941 | A | * | 5/1991 | Dhyanchand | 290/38 R |
| 5,027,265 | A | * | 6/1991 | Dhyanchand et al. | 322/28 |
| 5,038,095 | A | * | 8/1991 | Kirchberg et al. | 322/29 |
| 5,055,992 | A | * | 10/1991 | Cook | 363/132 |
| 5,068,590 | A | * | 11/1991 | Glennon et al. | 290/38 R |
| 5,587,647 | A | * | 12/1996 | Bansal et al. | 290/31 |

FOREIGN PATENT DOCUMENTS

| JP | 5-22938 | 1/1993 |
|---|---|---|
| JP | 2000-345952 | 12/2000 |

* cited by examiner

Primary Examiner—Bao Q. Vu
(74) Attorney, Agent, or Firm—Crowell & Moring LLP

(57) ABSTRACT

A power generation apparatus includes a permanent-magnet AC generator, a first converter for converting AC power into DC power, and a second converter for converting the DC power produced by the first converter into AC power. The first converter includes a unit for controlling active power and a unit for controlling reactive power and the second converter includes a unit for controlling a voltage of a DC system and reactive power or AC voltage of a power system.

10 Claims, 7 Drawing Sheets

POWER GENERATION APPARATUS USING PERMANENT-MAGNET GENERATOR

This application is a continuation of application Ser. No. 10/100,161, filed Mar. 19, 2002.

BACKGROUND OF THE INVENTION

The present invention-relates to a power generation apparatus using a permanent-magnet generator and more particularly to control of a power converter.

The power generation apparatus using the permanent-magnet generator uses a gas turbine, a hydropower, wave power or the like as a power source to rotate the permanent-magnetic generator. AC power generated by the permanent-magnet generator is converted into DC power by a first converter and the DC power produced by the first converter is converted into AC power by a second converter again to supply the AC power.

As a control method of the power generation apparatus using the permanent-magnet generator, JP-A-2000-345952 discloses "a wind power multipole generator and a wind power generation method" in which an active power command value is decided on the basis of the rotation speed of a multipole generator to control output power of a variable speed inverter. Further, JP-A-5-22938 discloses "a control circuit of a power conversion system" in which a power converter is controlled to make a terminal voltage of a permanent-magnet generator fixed.

In order to utilize energy obtained from the power source effectively, it is desirable to make the power generation apparatus using the permanent-magnet generator have robust characteristics with high efficiency.

In the prior art, since the active power command value is decided on the basis of the rotation speed of the power generator to control active power, measures for adjusting a power factor of the power generator are not provided and operation taking the efficiency into consideration as a power generation system is not always performed. Further, when the constant terminal voltage is maintained, a large reactive current is supplied in order to increase the terminal voltage in the area where the rotation speed of the power generator is low, so that a potential difference between the terminal voltage and an internal induced voltage of the power generator is increased to make a phase difference between the terminal voltage and the current large and consequently reduce the power generation efficiency.

SUMMARY OF THE INVENTION

It is an object of the present invention to provide a power generation apparatus using a permanent-magnet generator or a power generation system using the same having robust characteristics with high efficiency within a wide variable speed range in a capacity of a converter by means of control of reactive power or a voltage of a first converter.

The power generation apparatus using the permanent-magnet generator according to the present invention, includes a permanent-magnet generator for generating AC power, a first converter for converting the AC power generated by the generator into DC power, and a second-converter for converting the DC power produced by the first converter into AC power. The first converter includes means for controlling active power of the AC power of the generator and means for controlling reactive power of the AC power of the generator, and the second converter includes means for producing the active power.

In the power generation apparatus using the permanent-magnet generator according to the present invention, the first converter includes means for calculating a reactive power command value on the basis of an active power command value and a rotation speed of the generator and the first converter controls reactive power of the AC power of the generator on the basis of the active power command value and the rotation speed of the generator.

In the power generation apparatus using the permanent-magnet generator according to the present invention, the first converter includes means for controlling active power of the AC power of the generator, means for controlling a voltage of the AC power of the generator, and means for calculating a voltage command value on the basis of an active power command value and a rotation speed of the generator and the first converter controls a terminal voltage of the generator on the basis of the active power command value and the rotation speed of the generator.

A setting method of the power generation apparatus using the permanent-magnet generator according to the present invention, including means for calculating a reactive power command value on the basis of an active power command value and a rotation speed of the generator and means for calculating a voltage command value on the basis of the active power command value and the rotation speed of the generator, comprises setting up the reactive power command value or the voltage command value so that a phase difference between an output current of the generator and an internal induced voltage of the generator is equal to zero in accordance with the active power command value until a rotation speed at which a terminal voltage of the generator reaches a rated value is reached and setting up the reactive power command value or the voltage command value so that the terminal voltage is fixed in accordance with the active power command value in the area where the rotation speed is increased.

In the setting method of the power generation apparatus using the permanent-magnet generator according to the present invention, the first converter includes means for controlling active power of the AC power of the generator, means for controlling a voltage of the AC power of the generator, and means for calculating a voltage command value on the basis of an active power command value or the rotation speed of the generator, and the first converter controls a terminal voltage of the generator on the basis of the active power command value or the rotation speed of the generator.

The setting method of the power generation apparatus using the permanent-magnet generator according to the present invention, including means for calculating the voltage command value on the basis of the active power command value or the rotation speed of the generator, comprises setting up the voltage command value so that the terminal voltage is fixed in accordance with the active power command value or the rotation speed of the generator.

With the above configuration, there can be provided the power generation apparatus using the permanent-magnet generator having the robust characteristics with high efficiency while utilizing the converter capacity effectively.

Other objects, features and advantages of the invention will become apparent from the following description of the embodiments of the invention taken in conjunction with the accompanying drawings.

DESCRIPTION OF THE EMBODIMENTS (Embodiment 1)

Figure 1:
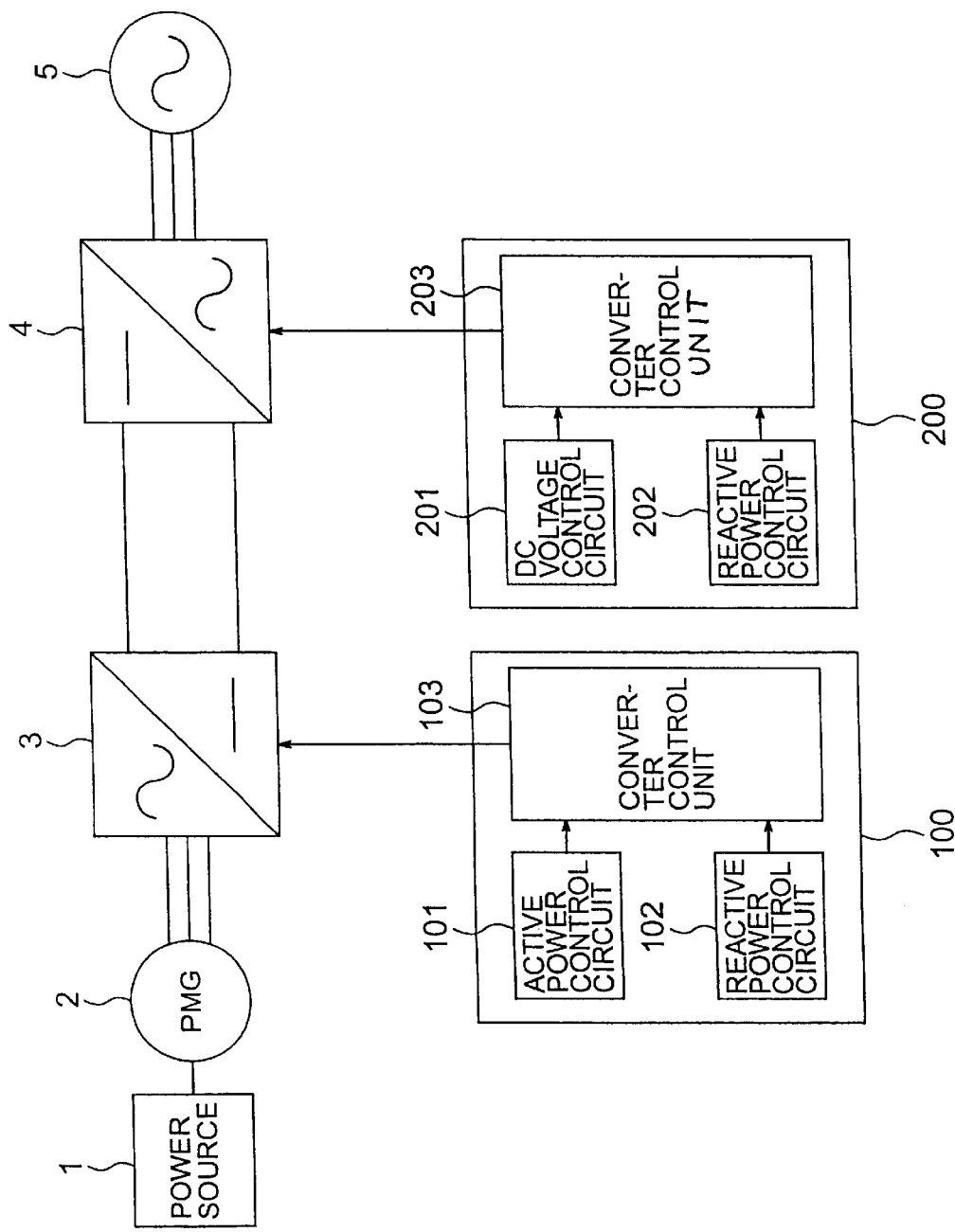
FIG. 1 is a block diagram schematically illustrating a power generation apparatus according to an embodiment 1 of the present invention.

Referring now to FIG. 1, a power generation apparatus according to an embodiment is described. The power generation apparatus using a permanent-magnet generator (hereinafter abbreviated as PMG) of the embodiment uses a power source 1 such as a gas turbine, hydropower, wave power or the like to rotate a permanent-magnet generator 2 and AC power generated by the permanent-magnet generator 2 is converted into DC power by a first converter 3. The DC power produced by the first converter 3 is again converted into AC power by a second converter 4 and the AC power is supplied to a power system 5. Each of the first and second converters 3 and 4 includes, as a three phase bridge circuit, 6 self-commutating semiconductor elements and 6 diodes constituting a self-commutated converter, for example. Each of the self-commutating semiconductor elements is connected to control apparatuses 100 and 200 for inputting control pulses.

The control apparatus 100 includes a converter control unit 103 which prepares control pulses on the basis of outputs of an active power control circuit 101 and a reactive power control circuit 102 and controls active power and reactive power generated by the permanent-magnet generator 2. On the other hand, the control apparatus 200 includes a converter control unit 203 which prepares control pulses on the basis of outputs of a DC voltage control circuit 201 and a reactive power control circuit or an AC voltage control circuit 202 and controls voltage of a DC system and reactive power or an AC voltage of the power system 5.

The control apparatus 100 of the first converter of the embodiment is now described in detail with reference to FIG. 2. The control apparatus 100 takes in a rotation speed N of the PMG detected by a rotation speed detection circuit 21, three-phase terminal voltages Vta, Vtb and Vtc of the PMG detected by a voltage detection circuit 22 and three-phase output currents Ia, Ib and IC of the PMG detected by a current detection circuit 23 and calculates active power Pf and reactive power Qf from the following equations (1), (2) and (3). The positive direction of the active power is defined by the power generation direction of the PMG and the positive and negative directions of the reactive power are defined by the leading direction and the lagging direction thereof, respectively.

$$\begin{bmatrix} V_{t\alpha} \\ V_{t\beta} \end{bmatrix} = 2/3 \begin{bmatrix} 1 & -1/2 & -1/2 \\ 0 & SQRT(3)/2 & -SQRT(3)/2 \end{bmatrix} \begin{bmatrix} V_{ta} \\ V_{tb} \\ V_{tc} \end{bmatrix} \quad (1)$$

$$\begin{bmatrix} I_{\alpha} \\ I_{\beta} \end{bmatrix} = 2/3 \begin{bmatrix} 1 & -1/2 & -1/2 \\ 0 & SQRT(3)/2 & -SQRT(3)/2 \end{bmatrix} \begin{bmatrix} I_a \\ I_b \\ I_c \end{bmatrix} \quad (2)$$

$$\begin{bmatrix} P_f \\ Q_f \end{bmatrix} = \begin{bmatrix} I_{\alpha} & I_{\beta} \\ I_{\beta} & -I_{\alpha} \end{bmatrix} \begin{bmatrix} V_{t\alpha} \\ V_{\beta} \end{bmatrix} \quad (3)$$

The active power control circuit 101 controls so that the active power Pf is equal to an active power command value Pr. A reactive power command value setting circuit 104 sets up a reactive power command value Qr on the basis of the active power command value Pr and the rotation speed N of the PMG and the reactive power control circuit 102 controls so that the reactive power Qf is equal to the command value Qr. The active power control circuit 101 and the reactive power control circuit 102 use PI (proportion and integration) control or the like. The converter control unit 103 prepares control pulses on the basis of outputs of the active power control circuit 101 and the reactive power control circuit 102 and supplies on-and-off signals for switching the self-commutating semiconductor elements to the first converter 3.

Figure 3:
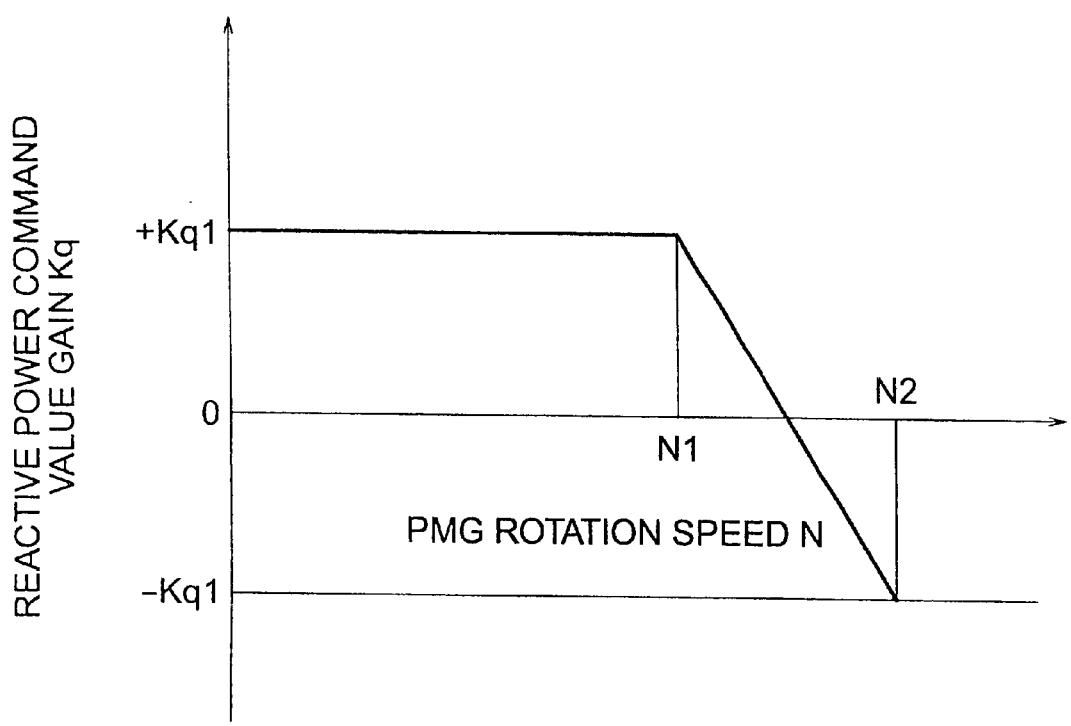
FIG. 3 is a diagram explaining a relation of an reactive power command value gain Kq and a PMG rotation speed N.

A setting method of the reactive power command value setting circuit 104 of the present invention is now described. FIG. 3 shows a relation of a reactive power command value gain Kg and the rotation speed N of the PMG. The rotation speed of the PMG at which that a terminal voltage reaches a rated value is defined to N1. The reactive power command value gain Kq is set up to a positive value until the rotation speed N1 is reached and the reactive power command value gain Kq is varied from the positive value to a negative value from after the rotation speed N1 until a rotation speed N2 at which a lagged reactive power is increased to a maximum output is reached. The gain Kq is set up to a fixed negative value after the rotation speed N2. ±Kq1 is set up to any value in accordance with-characteristics of the power source 1, the permanent-magnet generator 2 or the like so that the maximum command value Qr does not exceed the maximum output point of the reactive power and the reactive power command value gain Kq is decided in accordance with the rotation speed N of the PMG.

Figure 4:
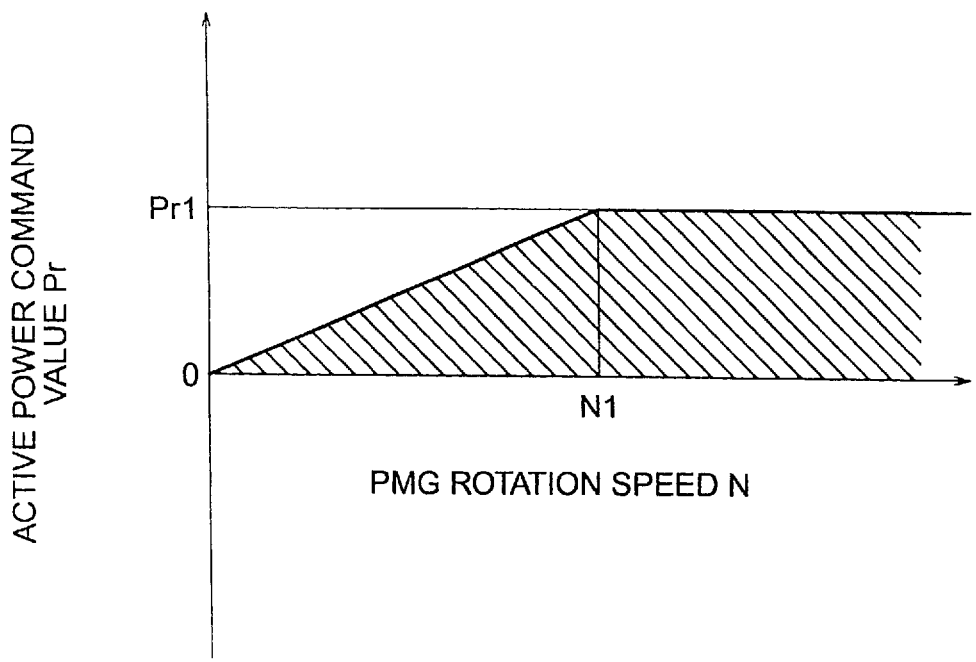
FIG. 4 is a diagram explaining a relation of a active power command value Pr and a PMG rotation speed N.

FIG. 4 shows an example of a relation of the active power command value Pr and the rotation speed N of the PMG. The active power command value Pr can adopt a value in the hatched area in accordance with the rotation speed when the rated value thereof is Pr1. The reactive power command value Qr is expressed by the following equation (4) from the reactive power command value gain Kq and the active power command value Pr.

$$Qr = Qo + Kq \cdot Pr \quad (4)$$

Figure 5:
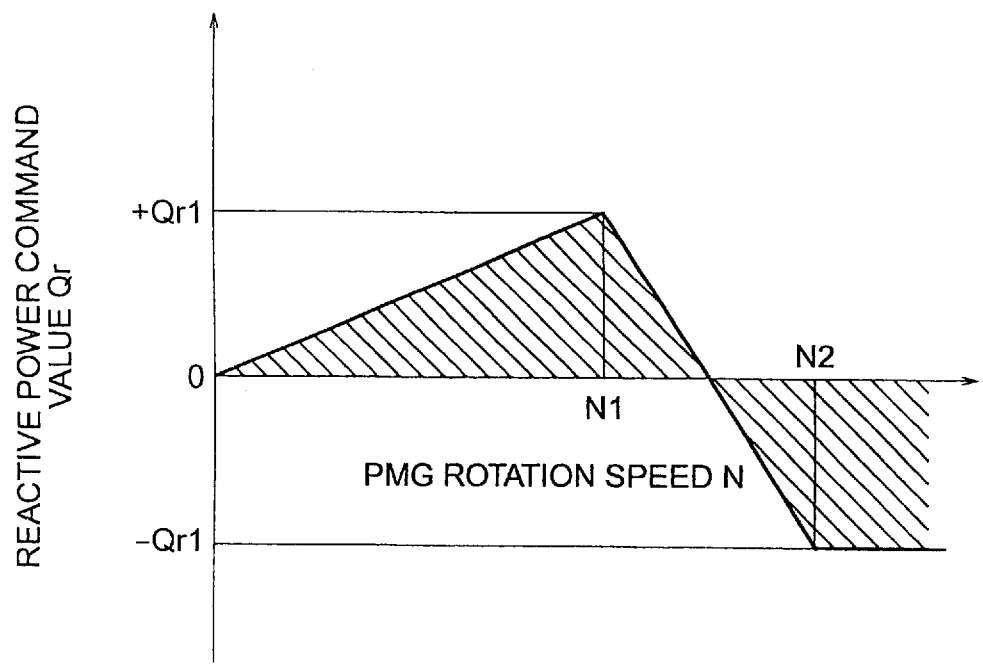
FIG. 5 is a diagram explaining a relation of a active power command value Qr and a PMG rotation speed N.

FIG. 5 shows an example of a relation of the reactive power command value Qr and the rotation speed N of the PMG. The reactive power command value Qr can adopt a value in the hatched area of FIG. 5 on the basis of the reactive power command value gain Kq determined by the active power command value Pr and the rotation speed N of the PMG and is a command value to the reactive power control circuit 102. When it is assumed that ±Kq1=±1.0 and Pr1=1.0PU, ±Qr1 is +(leading)1.0PU and−(lagging)1.0PU. A reactive power command initial value Qo is set up to zero in the embodiment, while it can be set up to any value in accordance with conditions of the power source 1, the permanent-magnet generator 2 and the like similarly to the reactive power command value gain Kq. The reactive power command value setting circuit 104 decides the reactive power command value Qr by using the characteristic of FIG. 3 and the following equation (5).

Figure 6:
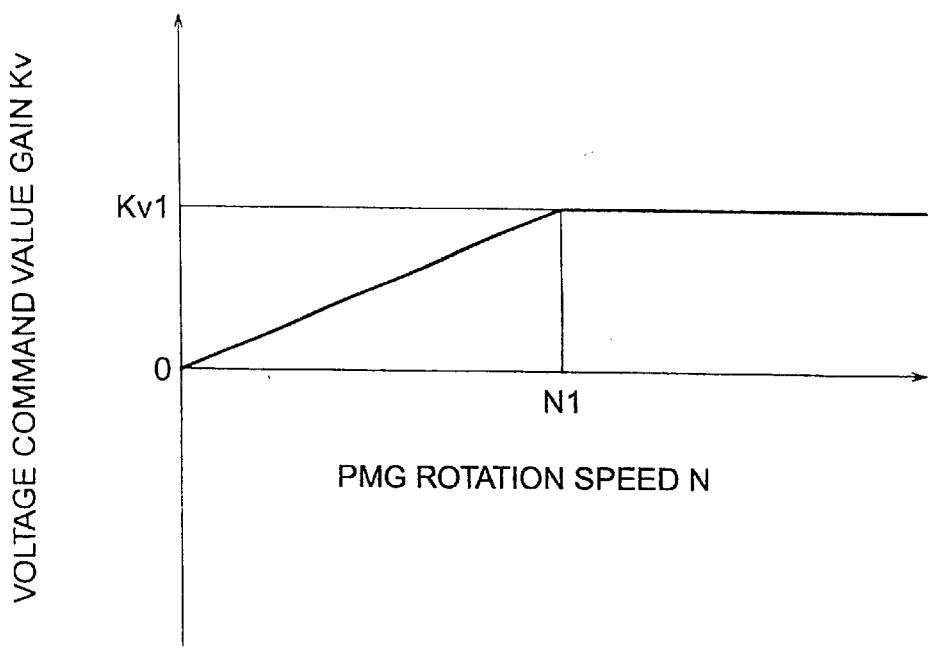
FIG. 6 is a diagram explaining a relation of a voltage command value gain Kv and a PMG rotation speed N.

FIG. 6 shows an example of a relation of a voltage command value gain Kv and the rotation speed N of the PMG. The voltage command value gain Kv is increased to Kv1 until the rotation speed N1 is reached. The voltage command value gain Kv is set up to a fixed Kv1 after the rotation speed N1 has been reached and is decided in accordance with the rotation speed N. Further, a voltage command value Vr is expressed by the following equation from the voltage command value gain Kv and the active power command value Pr.

$$Vr = Vo + Kr \cdot Pr \qquad (5)$$

Figure 8:
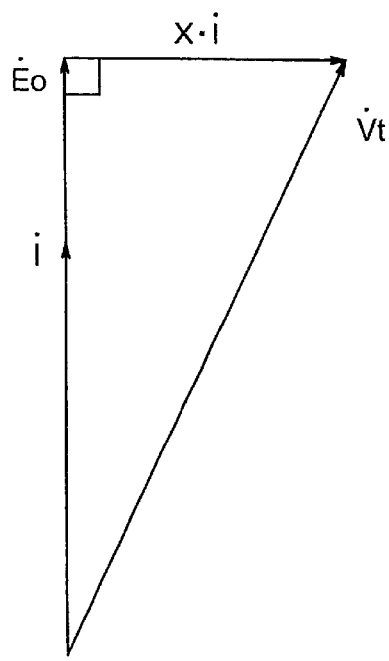
FIG. 8 is a vector diagram for explaining a control method in a steady rotation area.

Next, a control method of the embodiment is described with reference to vector diagrams of FIGS. 8 and 9 and FIG. 10. FIG. 8 is a vector diagram showing a control method in a low-speed rotation area.

That is, the low-speed rotation area is an area from zero to N1 of the rotation speed of the PMG. In FIG. 8, Eo represents an induced voltage, X a generator leakage reactance, I an output current and Vt a terminal voltage of the generator. Since the internal induced voltage Eo of the generator is increased in proportion to the rotation speed, the first converter 3 uses the control apparatus 100 to decide the reactive power command value Qr or the voltage command value Vr so that phases of the output current I of the generator and the internal induced voltage Eo of the generator are coincident with each other and control the terminal voltage Vt of the generator. Consequently, the power factor of the generator is improved and high efficiency of the power generation apparatus in the low-speed rotation area can be attained.

Figure 9:
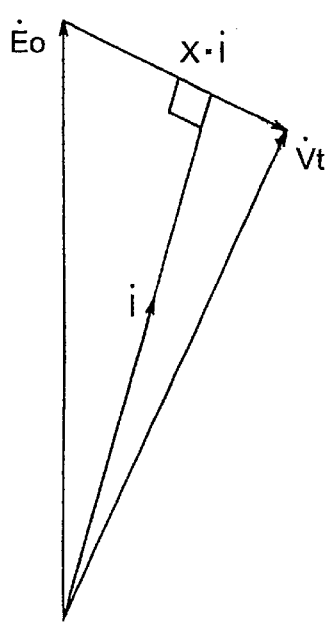
FIG. 9 is a vector diagram explaining a control method in a high-speed rotation area.

FIG. 9 is a vector diagram showing a control method in a high-speed rotation area.

That is, the high-speed rotation area is an area where the rotation speed of the PMG is larger than N1. Since the terminal voltage Vt of the generator has already reached the rated value at the rotation speed N1 as described above, the power generation apparatus is stopped due to over-voltage if the rotation speed is increased as it is. Accordingly, the first converter 3 uses the control apparatus 100 to decide the reactive power command value Qr or the voltage command value Vr so that the output current I of the generator is lagged behind the internal induced voltage Eo of the generator and control the terminal voltage Vt of the generator. Consequently, a variable speed range of the generator in the high-speed rotation area can be widened.

Figure 10:
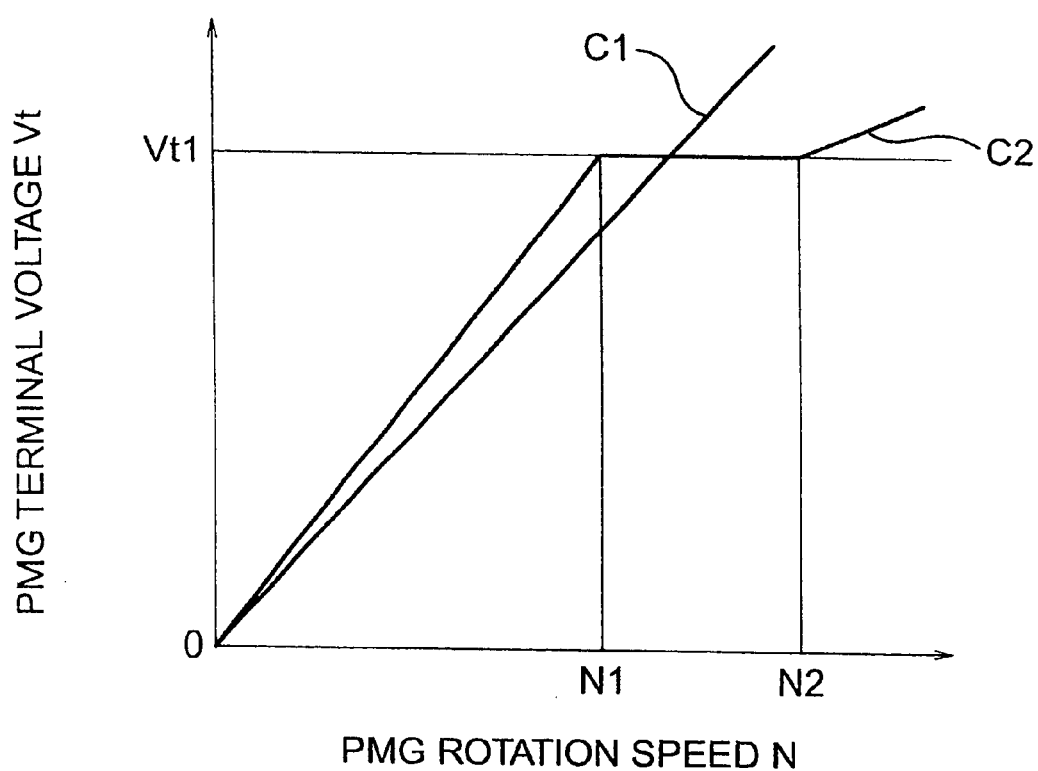
FIG. 10 is a diagram explaining a relation of a PMG terminal voltage Vt and a PMG rotation speed N.

FIG. 10 shows a relation of the terminal voltage Vt and the rotation speed N of the PGM. C1 represents the relation in case where the reactive power or voltage is not controlled and C2 represents the relation according to the present invention. In the low-speed rotation area, that is, in the area where the rotation speed is zero to N1, the terminal voltage is controlled to be higher than C1 in order to satisfy the relation of the vector diagram shown in FIG. 8. Further, in the high-speed rotation area, that is, in the area where the rotation speed is N1 to N2, the terminal voltage is maintained to the rated value Vt1 so that the variable speed range of the generator is widened and after the rotation speed exceeds N2, the voltage is increased again since the reactive power which the converter can produce is increased to the maximum.

(Embodiment 2)

Figure 2:
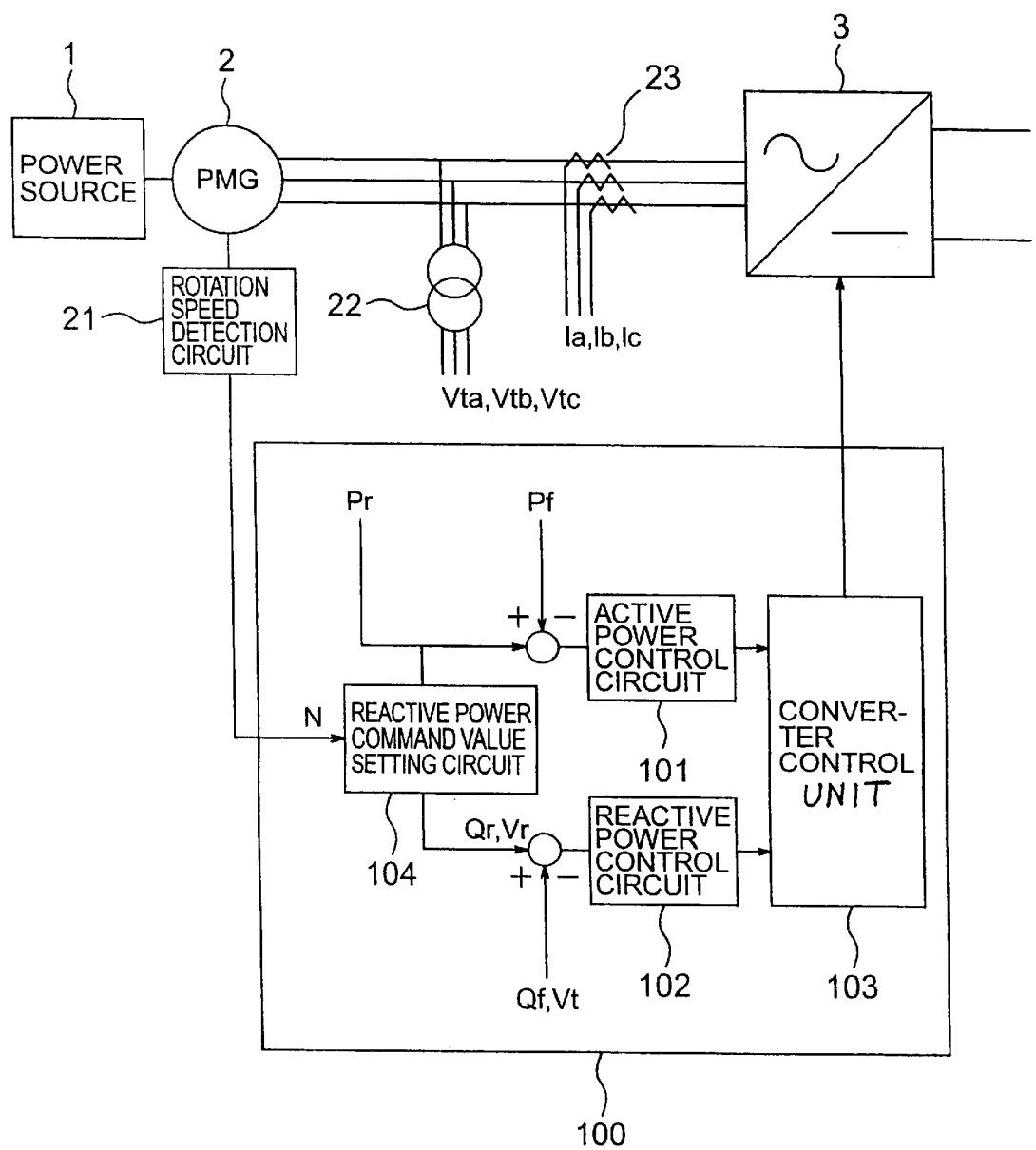
FIG. 2 is a block diagram illustrating a control apparatus of a first converter used in the power generation apparatus of the embodiment 1.

The embodiment is the same as the embodiment 1 with the exception that the reactive power control circuit 102 and the reactive power command value setting circuit 104 of FIG. 2 are replaced by a voltage control circuit and a voltage command value setting circuit, respectively, and the voltage command value setting circuit decides the voltage command value Vr on the basis of the active power command value Pr and the rotation speed N of the PGM, the voltage control circuit 102 controlling so that the terminal voltage Vt of the PMG is equal to the command value Vr, the terminal voltage Vt of the PMG being calculated by the following equation (6):

$$Vt = SQRT(Vt\alpha^2 + Vt\beta^2) \qquad (6)$$

The voltage control circuit uses the PI (proportion and integration) control in the same manner as described above.

Figure 7:
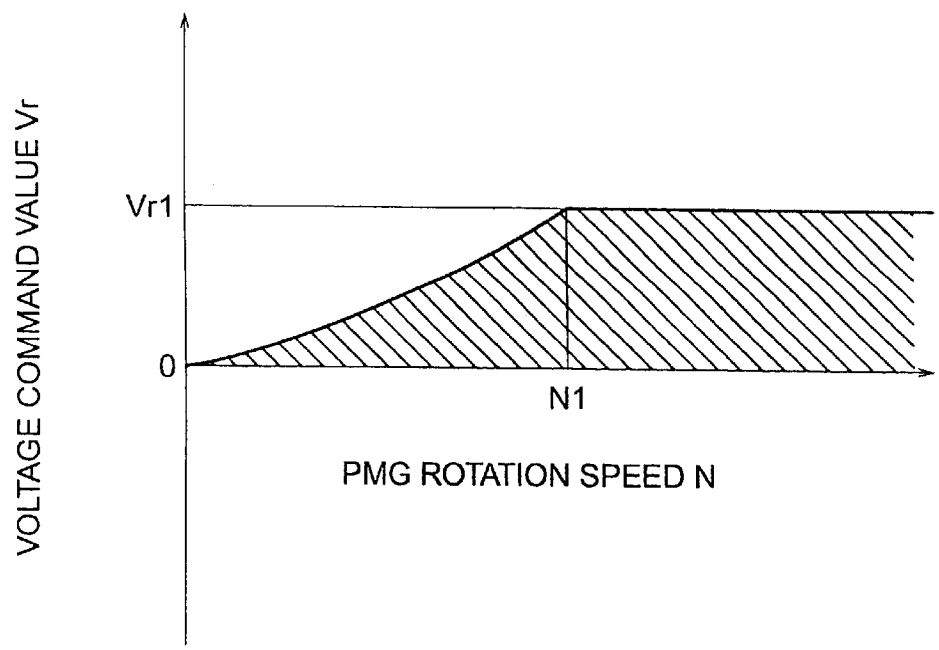
FIG. 7 is a diagram explaining a relation of a voltage command value Vr and a PMG rotation speed N.

FIG. 7 shows an example of a relation of the voltage command value Vr and the rotation speed N ocf the PMG. The voltage command value Vr is set up to a value in the hatched area of FIG. 7 on the basis of the active power command value Pr and the voltage command value gain Kv determined from the rotation speed N of the PMG and becomes a command value to the voltage control circuit. Vr1 is 1.0PU when Kv=1.0 and Pr1=1.0PU, for example. The setting method of the voltage command initial value Vo and the realization method by the equation (6) and the characteristic of FIG. 6 are the same as those of the reactive power command value setting circuit 104 of the embodiment 1.

Further, in the case of the power generation apparatus in which energy of the power source is transmitted to the PMG stably as a gas turbine, for example, since the active power substantially proportional to the rotation speed of PMG is obtained, any of the active power command value Pr or the rotation speed N of the PMG may be inputted to the voltage command value setting circuit. That is, in this case, when the voltage command value Vr is determined on the basis of any of the active power command value Pr or the rotation speed N of the PMG, there are obtained the same effects as the case where both of the active power command value Pr and the rotation speed N of the PMG are used.

According to the present invention, the efficiency of the permanent-magnet generator can be enhanced and the variable speed range can be widened by control of the reactive power or voltage of the power converter and there can be provided the power generation apparatus having the robust characteristics with high efficiency while utilizing the converter capacity effectively.

It should be further understood by those skilled in the art that the foregoing description has been made on embodiments of the invention and that various changes and modifications may be made in the invention without departing from the spirit of the invention and the scope of the appended claims.

What is claimed is:

1. A method of controlling a power generation apparatus including a permanent-magnet generator for generating AC power driven by a gas turbine as a power source, a first converter for converting the AC power generated by said generator into DC power, and a second converter for converting the DC power produced by said first converter into AC power, said method comprising:
    a voltage command value setting circuit determining a voltage command value based on rotational speed of said generator;
    inputting a difference between a terminal voltage of said generator and said voltage command value into a voltage control circuit;

inputting an output from said voltage control circuit and an output from an active power control circuit into a converter control unit; and said converter control unit outputting control pulses for controlling said first converter, based on said outputs from said voltage control circuit and said active power control circuit.

2. A method according to claim 1, wherein:

said voltage command value is increased in response to increasing rotational speed of said generator when the rotational speed is within a range from zero to N1 at which a terminal voltage of said generator becomes a rated voltage of said generator; and the voltage command value is maintained constant in a positive fixed value when the rotational speed is N1 or higher.

3. A method according to claim 2, wherein self-commutating elements of said first converter are controlled to be turned on and off by said control pulses from said converter control unit.

4. A method of controlling a power generation apparatus including a permanent-magnet generator for generating AC power driven by a gas turbine as a power source, a first converter for converting the AC power generated by said generator into DC power, and a second converter for converting the DC power produced by said first converter into AC power, said method comprising:

a voltage command value setting circuit determining a voltage command value based on an active power command value;

inputting a difference between a terminal voltage of said generator and said voltage command value into a voltage control circuit;

inputting an output from said voltage control circuit and an output from an active power control circuit into a converter control unit; and said converter control unit outputting control pulses for controlling said first converter, based on said outputs from said voltage control circuit and said active power control circuit.

5. A method according to claim 4, wherein:

said voltage command value is increased in response to increasing rotational speed of said generator when the rotational speed is within a range from zero to N1 at which a terminal voltage of said generator becomes a rated voltage of said generator; and the voltage command value is maintained constant in a positive fixed value when the rotational speed is N1 or higher.

6. A method according to claim 5, wherein self-commutating elements of said first converter are controlled to be turned on and off by said control pulses from said converter control unit.

7. A computer readable medium encoded with a program for controlling a power generation apparatus including a permanent-magnet generator for generating AC power driven by a gas turbine as a power source, a first converter for converting the AC power generated by said generator into DC power, and a second converter for converting the DC power produced by said first converter into AC power, said program embodying a method comprising:

a voltage command value setting unit determining a voltage command value based on rotational speed of said generator;

inputting a difference between a terminal voltage of said generator and said voltage command value into a voltage control unit;

inputting an output from said voltage control unit and an output from an active power control unit into a converter control unit; and said converter control unit outputting control pulses for controlling said first converter, based on said outputs from said voltage control unit and said active power control unit.

8. The computer readable medium according to claim 7, wherein:

said voltage command value is increased in response to increasing rotational speed of said generator when the rotational speed is within a range from zero to N1 at which a terminal voltage of said generator becomes a rated voltage of said generator; and the voltage command value is maintained constant in a positive fixed value when the rotational speed is N1 or higher.

9. A computer readable medium encoded with a program for controlling a power generation apparatus including a permanent-magnet generator for generating AC power driven by a gas turbine as a power source, a first converter for converting the AC power generated by said generator into DC power, and a second converter for converting the DC power produced by said first converter into AC power, said program embodying a method comprising:

a voltage command value setting unit determining a voltage command value based on an active power command value;

inputting a difference between a terminal voltage of said generator and said voltage command value into a voltage control unit;

inputting an output from said voltage control unit and an output from an active power control unit into a converter control unit; and said converter control unit outputting control pulses for controlling said first converter, based on said outputs from said voltage control unit and said active power control unit.

10. The computer readable medium according to claim 9, wherein:

said voltage command value is increased in response to increasing rotational speed of said generator when the rotational speed is within a range from zero to N1 at which a terminal voltage of said generator becomes a rated voltage of said generator; and the voltage command value is maintained constant in a positive fixed value when the rotational speed is N1 or higher.

* * * * *